United States Patent
Hung

(10) Patent No.: US 7,952,779 B2
(45) Date of Patent: May 31, 2011

(54) STABILIZING OSCILLATION AMPLITUDE OF TORSION OSCILLATOR AT PREDETERMINED FREQUENCY

(75) Inventor: Chang-li Hung, Taipei (TW)

(73) Assignee: Opus Microsystems Corporation, Taipei (TW)

( * ) Notice: Subject to any disclaimer, the term of this patent is extended or adjusted under 35 U.S.C. 154(b) by 459 days.

(21) Appl. No.: 12/117,113

(22) Filed: May 8, 2008

(65) Prior Publication Data
US 2008/0278783 A1   Nov. 13, 2008

(30) Foreign Application Priority Data

May 9, 2007   (TW) ............................... 96116556 A

(51) Int. Cl.
G02B 26/08   (2006.01)

(52) U.S. Cl. ................ 359/199.1; 359/213.1; 359/225.1

(58) Field of Classification Search ............... 359/199.1, 359/199.4, 200.8, 213.1, 225.1, 199.2, 199.3; 250/234–236
See application file for complete search history.

(56) References Cited

U.S. PATENT DOCUMENTS

| | | |
|---|---|---|
| 6,838,661 B2 | 1/2005 | Klement |
| 2004/0120023 A1* | 6/2004 | Bush et al. ............. 359/213 |
| 2005/0030605 A1* | 2/2005 | Cannon et al. ......... 359/199 |

\* cited by examiner

*Primary Examiner* — Frank G Font

(74) *Attorney, Agent, or Firm* — Kirton & McConkie; Evan R. Witt

(57) ABSTRACT

A control method of stabilizing the oscillation amplitude of a torsion oscillator is described. The method includes the steps of: driving a torsion oscillator at a predetermined frequency with a drive energy level by a control module to generate a scanning angle of the incident light beam, wherein the drive energy level is associated with the predetermined frequency; comparing the scanning angle corresponding to the drive energy level with a designate scanning angle by the control module; and adjusting the drive energy level based on the comparison result until the scanning angle of the torsion oscillator is equal to the designate scanning angle.

23 Claims, 14 Drawing Sheets

STABILIZING OSCILLATION AMPLITUDE OF TORSION OSCILLATOR AT PREDETERMINED FREQUENCY

FIELD OF THE INVENTION

The present invention relates to a method of controlling a torsion oscillator, and more particularly relates to a method of controlling a torsion oscillator to stabilize its oscillation amplitude at a predetermined frequency.

BACKGROUND OF THE INVENTION

Torsion oscillators are widely used in laser printers, copiers, fax machines, bar code scanners, laser scanning projectors, laser radars and laser scanning sensors etc. The reflective mirror of the torsion oscillator swings back and forth periodically and deflects the incident light beam to form a scanning span or a scanning angle. The torsion oscillator can be driven by various principles, such as electromagnetic force, electrostatic force, or piezoelectric force. The span or angle of the oscillation can be controlled by adjusting the drive energy input to the torsion oscillator. In case of electromagnetic force, the torsion oscillator can be actuated by the Lorentz's force which can be generated by applying an alternating current to the conductive coils arranged around the movable mirror of the oscillator and perpendicular to the preset magnetic field. The torsion oscillator will oscillate at the same alternating frequency of the current. The scanning span is proportional to the energy level of the drive current or the intensity of the magnetic field and the oscillation frequency is typically the same as of the drive signal frequency.

The scanning span of the torsion oscillator should be kept to a constant to stabilize the projected image for applications such as laser printing. U.S. Pat. No. 6,838,661, "Torsion oscillator stabilization including maintaining the amplitude of the oscillator without changing its drive frequency", discloses a control method based on determining resonance frequency during start-up of the torsion oscillator. Since the resonance frequency of the torsion oscillator depends on environmental factors such as ambient temperature, humidity and atmospheric pressure, the control method needs to determine the resonance frequency with iterative procedures involving sensing and computation during every start-up of the oscillator. In addition, the resonance frequency may also depend on the drive energy level; therefore, the procedures of determining resonance frequency and maintaining oscillation amplitude by altering drive energy level are coupled and complex processes which are time consuming and expensive.

In the application of a laser beam printer, the modulation of laser beam and the rotation of photosensitive optical pickup (OPC) drum need to be synchronized to ensure proper printing of image and text. If the scanning frequency of the torsion oscillator is adjusted due to change in operating condition such as temperature change, the rotation speed of the OPC drum may need to be adjusted accordingly for synchronization. Therefore, the drive motor speeds of the OPC drum and of the paper feeding mechanism, and the timing of laser modulation need to be controlled precisely that leads to increase of system complexity and cost.

FIG. 1 illustrates a conventional arrangement of a torsion oscillator 102 to scan an incident light beam (not shown), and a left sensor 100a, and a right sensor 100b to detect the scanned light beam for synchronization and/or scan amplitude control purposes. Light beams 106a and 106b are the incident light beam deflected by the torsion oscillator 102 at the left and the right extremes of the scanning angle $\theta_0$, respectively. The torsion oscillator 102 deflects the light beam in a sinusoidal motion along a projected scan trajectory shown as a dashed line in FIG. 1. Sensors 100a and 100b are positioned within the extremes of the projected scan trajectory and the effective or usable scan angle for image forming is limited within the span of the sensors.

FIG. 2 illustrates the waveforms of the sensing signals from both sensors 100a and 100b and the scanning angle of the deflected light beam. With the horizontal axis representing time and the vertical axis representing signal amplitude, diagram (A) and (C) shows the sensing signals of the sensors 100a and 100b, respectively. In diagram (B), the horizontal axis represents time and the vertical axis represents the amplitude of the scanning angle. Sensing signals 200 and 202 are generated when the deflected light beam passes through the left sensor 100a while sensing signals 204 and 206 are generated when the light beam passes through sensor 100b. The period of an oscillation cycle T is the sum of time intervals $t_1$ and $t_2$ defined by the intervals between the sensing signals. The effective scan span or usable scan angle $\theta_p$ is limited by the locations of the sensors 100a and 100b for imaging forming and is less than the full scanning span or the scanning angle $\theta_0$. For applications requiring constant scan angles, one need to determine the scan angle $\theta_0$ using both the time interval $t_1$ or $t_2$ and the effective scan span $\theta_p$. A smaller effective scan span may lead to larger system dimension in order to obtain a projected scan trajectory with enough width.

SUMMARY OF THE INVENTION

One objective of the present invention is to provide a method of controlling a torsion oscillator to stabilize the oscillation amplitude of the torsion oscillator at a predetermined frequency with simplified control method.

Another objective of the present invention is to provide a method of controlling a torsion oscillator to stabilize the oscillation amplitude of the torsion oscillator at a predetermined frequency for saving the computation time by eliminating the needs of finding resonance frequency of the torsion oscillator.

Still another objective of the present invention is to provide a method of controlling a torsion oscillator to stabilize the oscillation amplitude of the torsion oscillator at a predetermined frequency for decreasing the manufacturing cost of the image systems.

Still another objective of the present invention is to provide a method of controlling a torsion oscillator to stabilize the oscillation amplitude of the torsion oscillator at a predetermined frequency and maximizing the usable oscillation span by sensing the light beam at the scanning limits.

According to the above objectives, the present invention sets forth a method of controlling a torsion oscillator to stabilize the oscillation amplitude of the torsion oscillator at a predetermined frequency. The predetermined frequency is pre-selected based on the frequency responses of the torsion oscillator by minimizing the drive energy levels according to a designate scanning angle under operating environment extremes. The control system performing the controlling method includes a light generator, a torsion oscillator, a sensor, and a control module. The light generator irradiates a light beam such as a laser beam. The torsion oscillator has a reflective surface for deflecting the incident light beam. When actuated at the predetermined frequency, the reflective surface of the torsion oscillator swings back and forth, and deflects the incident light beam with a scanning angle. The deflected light beam sweeps over the sensor which generates sensing signals corresponding to the motion of the light beam.

The time difference between the sensing signals is associated with the scanning angle. The control module is coupled to the sensor and compares the scanning angle from the time difference between the sensing signals with a designate scanning angle. The control module keeps the drive signal frequency equal to the predetermined frequency and adjusts the drive energy level to the torsion oscillator such that the scanning angle of the torsion oscillator is equal to the designate scanning angle.

The method of controlling a torsion oscillator comprises the steps of:

A control module generates a drive signal with a frequency equal to a predetermined frequency and an energy level equal to an initial drive energy level. The predetermined frequency is pre-selected within a frequency interval overlapped by two frequency intervals, wherein each of the frequency intervals represents an interval obtained based on the frequency response curve of the torsion oscillator according to a designate scanning angle under an operating environment extreme.

The torsion oscillator is driven by the initial drive energy level for generating a scanning angle corresponding to the drive energy level.

The control module compares the scanning angle of the torsion oscillator corresponding to the drive energy level with a designate scanning angle.

The control module adjusts the drive energy level based on the comparison result until the scanning angle of torsion oscillator is equal to the designate scanning angle.

The control module maintains the drive energy level to be unchanged if the scanning angle is equal to the designate scanning angle. The control module adjusts the drive energy level for equalizing the scanning angle to the designate scanning angle if the scanning angle is either greater than or smaller than the designate scanning angle.

The control method of the present invention eliminates the procedures to calculate the resonance frequency of the torsion oscillator during start-up and during operation. The predetermined frequency and the corresponding drive energy levels are determined by characterization tests of the torsion oscillator under operating environment extremes.

The features of the present invention includes: (1) simplifying the control method of the torsion oscillator; (2) saving the computation time of the resonance frequency; (3) decreasing the manufacturing cost; and (4) increasing the usable range of the scanning angle.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE PREFERRED EMBODIMENTS

Figure 1:
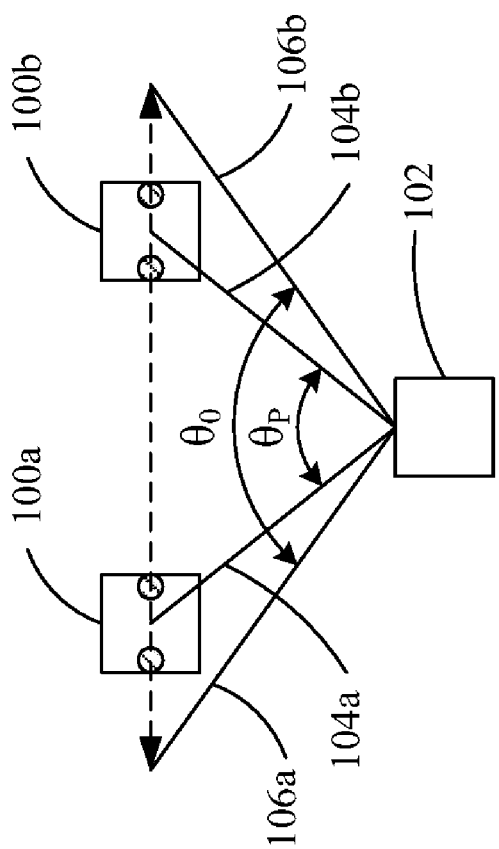
FIG. 1 illustrates a conventional arrangement of a torsion oscillator, a left-hand side sensor and a right-hand side sensor in an image forming apparatus.
Figure 2:
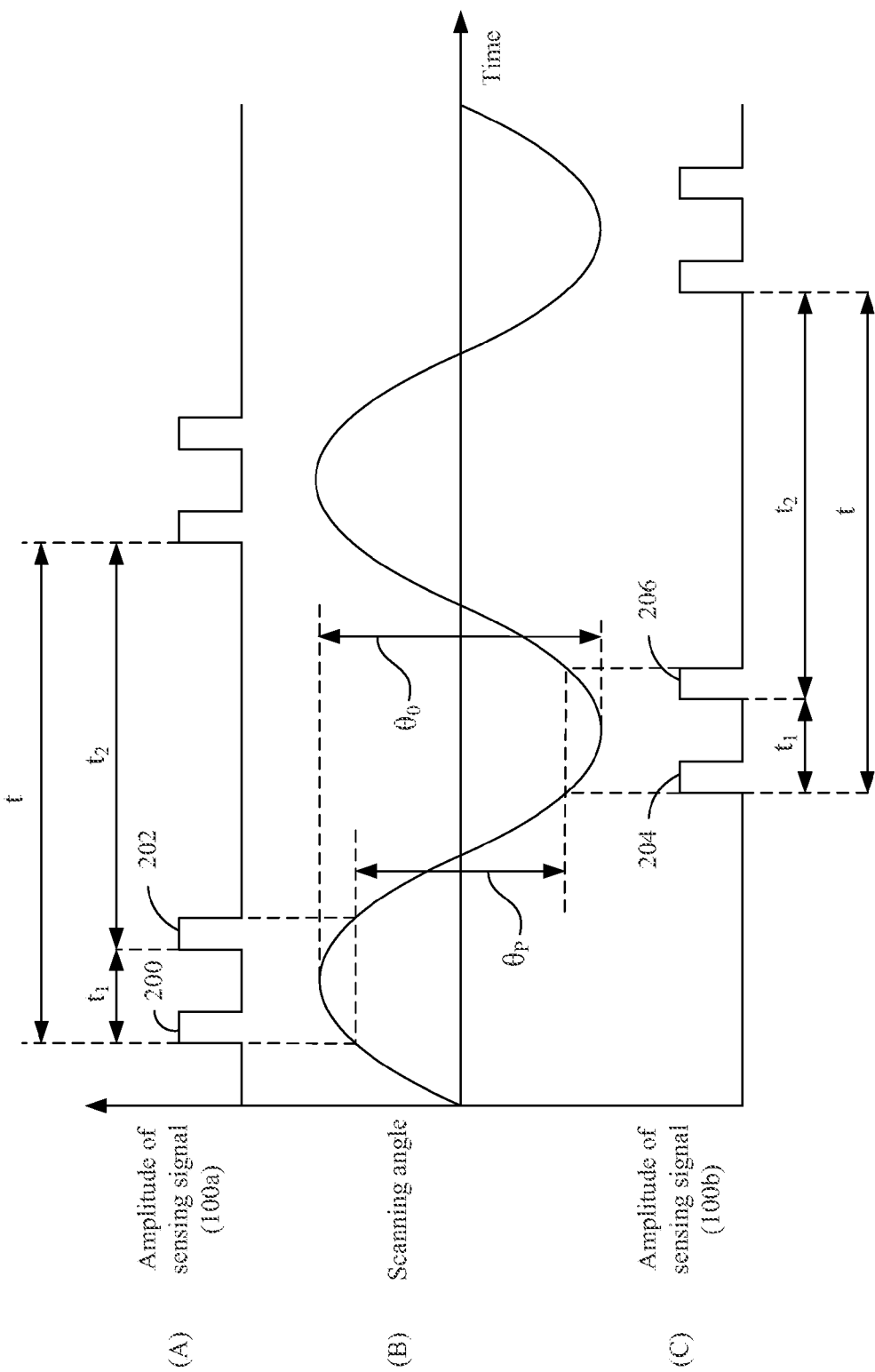
FIG. 2 illustrates the waveforms of the sensing signals and the scanning angle (or termed as span) of the conventional arrangement as shown in FIG. 1.
Figure 3:
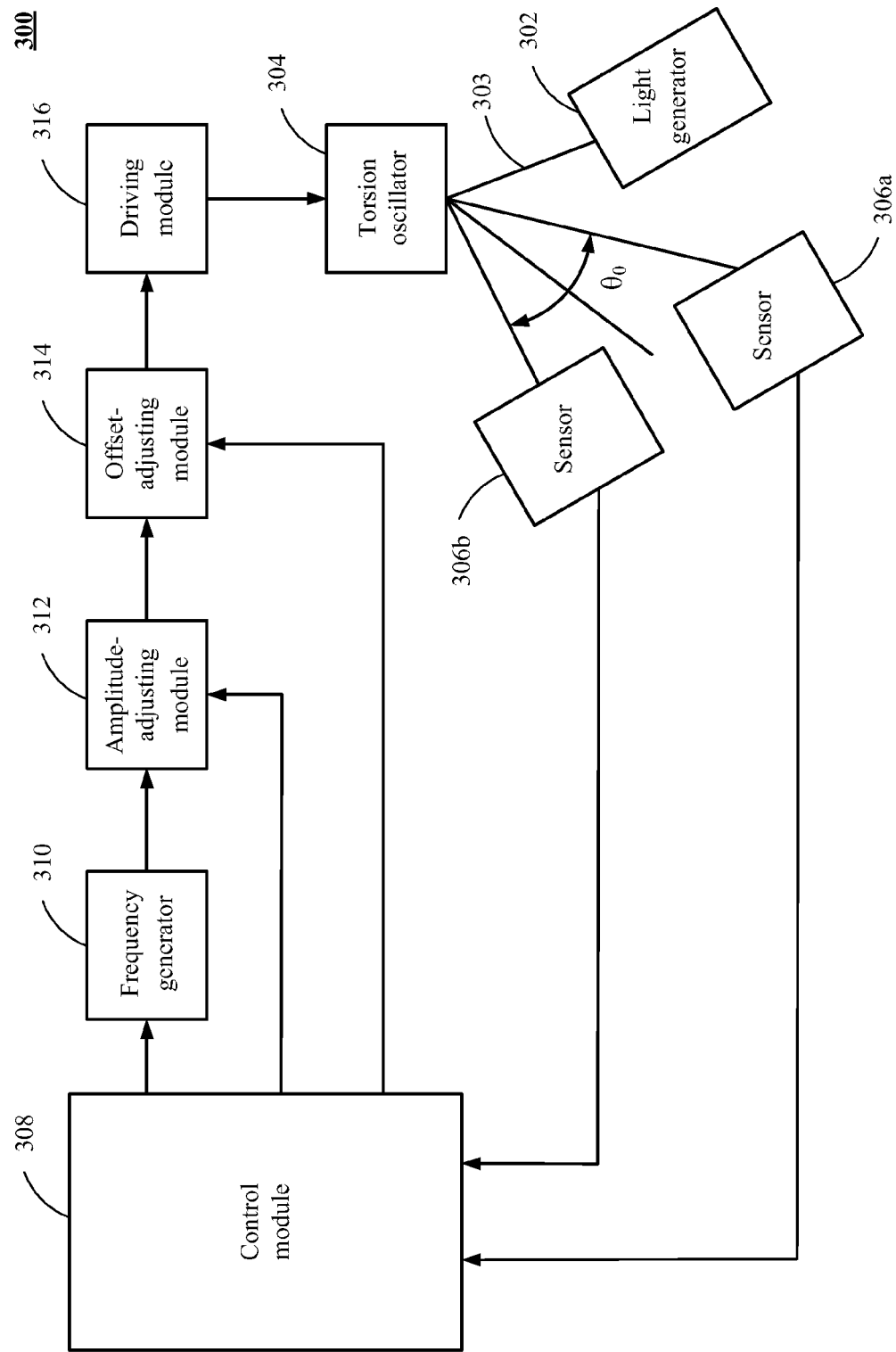
FIG. 3 is a schematic view of the control system of the torsion oscillator according to one embodiment of the present invention.

FIG. 3 is a schematic view of the control system of the torsion oscillator according to one embodiment of the present invention. The control system 300 is applicable to image systems, such as laser printers, copiers, fax machines, bar code scanners, laser scanning projectors, laser radars and laser scanning sensors. The control system 300 includes a light generator 302, a torsion oscillator 304, a sensor 306, a control module 308, a frequency generator 310, an amplitude-adjusting module 312, an offset-adjusting module 314, and a driving module 316. The light generator 302 is a light beam generator which emits a light beam 303. The torsion oscillator 304 has a reflecting mirror (not shown) to reflect the incident light beam 303. When the drive energy is applied to the torsion oscillator 304, the mirror swings back and forth to deflect the light beam 303 and forming a scanning angle $\theta_0$. The sensors 306 are triggered by the scanned light beam deflected from the torsion oscillator 304 to generate the corresponding sensing signals. The time difference between the sensing signals is associated with the scanning angle of the torsion oscillator 304. The control module 308 is coupled to the sensor 306 and controls the scanning angle of the torsion oscillator 304 to be equal to a designate scanning angle.

The frequency generator 310 is coupled to the control module 308 and generates a predetermined frequency signal. The amplitude-adjusting module 312 is coupled to both the frequency generator 310 and the control module 308 to determine the drive energy level for controlling the scanning angle of the torsion oscillator 304. The offset-adjusting module 314 is coupled to the amplitude-adjusting module 312 and the control module 308, respectively, to determine the offset of the drive energy level such that the scanning angle of the torsion oscillator 304 is symmetric. The driving module 316 is coupled to the torsion oscillator 304 to generate a drive signal for the torsion oscillator 304 wherein the frequency of the drive signal is equal to the predetermined frequency.

Figure 4:
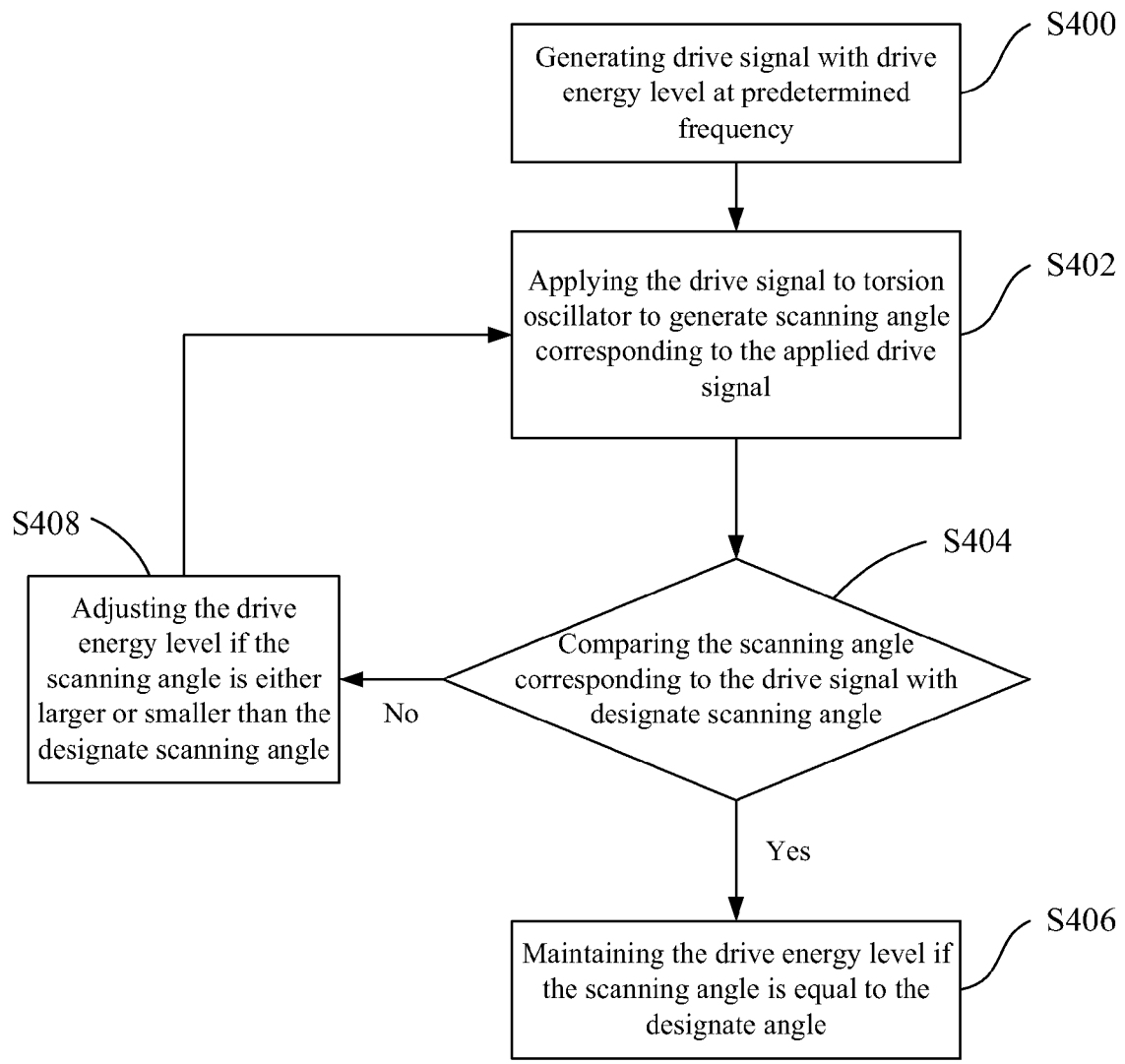
FIG. 4 is a flow chart of controlling the torsion oscillator according to one embodiment of the present invention.

FIG. 4 is a flow chart of stabilizing the scanning angle of the torsion oscillator 304 according to one embodiment of the present invention. In step S400, the control module 308 generates a drive signal with a drive energy level at a predetermined frequency. Afterward, in step S402, the drive signal is applied to the torsion oscillator 304 to generate a scanning angle of an incident light beam corresponding to the applied drive signal. In step S404, the control module 308 compares the scanning angle corresponding to the drive signal with a designate scanning angle. If the scanning angle is equal to the designate angle based on the comparison result of step S404, the control module 308 maintains the drive energy level as in step S406. If the scanning angle is either larger or smaller than the designate scanning angle based on the comparison result of step S404, the control module adjusts the drive energy level and returns to step S402 and step S404 until the scanning angle is equal to the designate scanning angle.

Figure 5A:
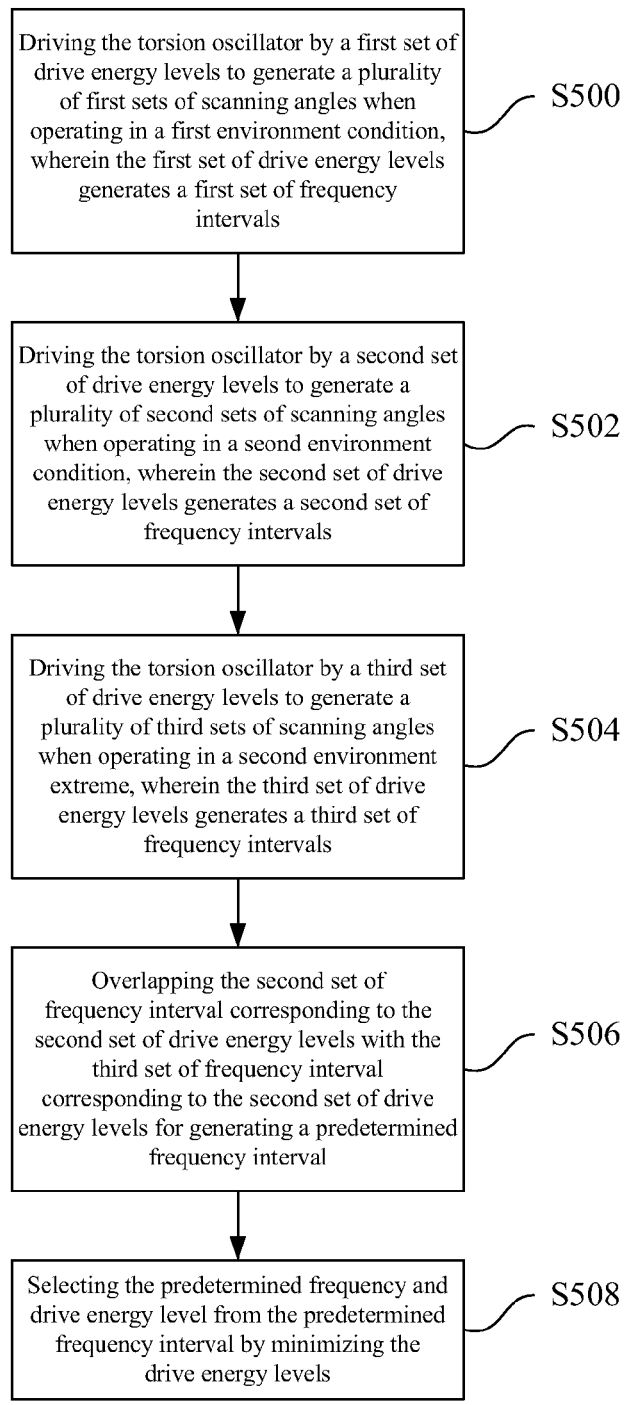
FIG. 5A is a flow chart of determining the predetermined frequency according to the first embodiment of the present invention.
Figure 5B:
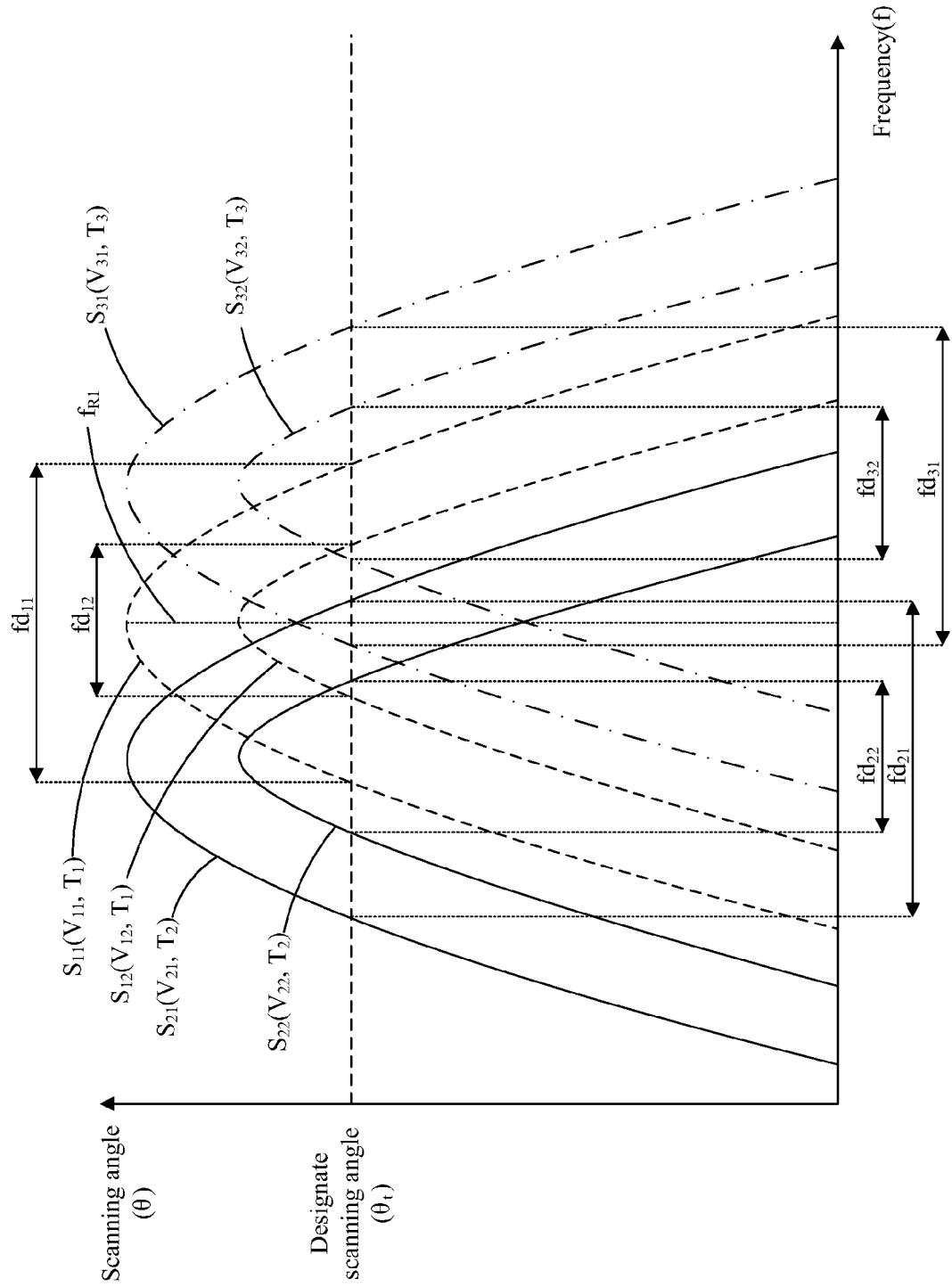
FIG. 5B is a schematic view of frequency response curves when the torsion oscillator is operated at different environment extremes according to the first embodiment of the present invention.

The predetermined frequency and the corresponding drive energy level in step S400 are pre-selected based on results of characterization tests of the torsion oscillator under operating environment extremes. FIG. 5A is a flow chart of defining the predetermined frequency according to the first embodiment of the present invention. In step S500, when the torsion oscillator 304 is operated in a first environment condition $T_1$, the first set of drive energy levels $V_{11}$ and $V_{12}$ drive the torsion oscillator 304 to generate a plurality of first sets of scanning angles. Each of the first sets of scanning angles corresponds to the first set of drive energy levels $V_{11}$ and $V_{12}$, and thus generates the first set of frequency response curves $S_{11}$ and $S_{12}$ as shown in FIG. 5B. The drive energy level $V_{11}$ is preferably greater than the drive energy level $V_{12}$ and generates larger scanning angle of the torsion oscillator 304. The first set of drive energy levels $V_{11}$ and $V_{12}$ corresponds to the first set of frequency response curves $S_{11}$ and $S_{12}$, respectively, and generates the first set of frequency intervals $fd_{11}$ and $fd_{12}$, defined as the frequency ranges wherein the first sets of scanning angles corresponding to the first set of drive energy levels $V_{11}$, $V_{12}$ are either greater than or equal to the designate scanning angle $\theta_r$. In addition, the scanning angle reaches its maximum value when the frequency equals the resonance frequency $f_{R1}$, and the scanning angle decreases as the drive frequency becomes either higher or lower than the resonance frequency $f_{R1}$ as illustrated by the frequency response curves $S_{11}$ as shown in FIG. 5B.

In step S502 when the torsion oscillator 304 is operated in a second environment condition $T_2$, the second set of drive energy levels $V_{21}$ and $V_{22}$ drives the torsion oscillator 304 to generate a plurality of second sets of scanning angles. Each of the second sets of scanning angles corresponds to the second set of drive energy levels $V_{21}$, and $V_{22}$ and thus generates the second set of frequency response curves $S_{21}$ and $S_{22}$ as shown in FIG. 5B. The drive energy level $V_{21}$ is preferably greater than the drive energy level $V_{22}$. The second set of drive energy levels $V_{21}$ and $V_{22}$ corresponds to the second set of frequency response curves $S_{21}$ and $S_{22}$, respectively, and defines the second set of drive frequency intervals $fd_{21}$ and $fd_{22}$, the frequency ranges wherein the second sets of scanning angles corresponding to the second set of drive energy levels $V_{21}$ and $V_{22}$ are either greater than or equal to the designate scanning angle $\theta_r$.

In step S504 when the torsion oscillator 304 is operated in a third environment condition $T_3$, the third set of drive energy levels $V_{31}$ and $V_{32}$ drives the torsion oscillator 304 to generate a plurality of third sets of scanning angles. Each of the third sets of scanning angles corresponds to the third set of drive energy levels $V_{31}$ and $V_{32}$ and thus generates the third set of frequency response curves $S_{31}$ and $S_{32}$ as shown in FIG. 5B. The drive energy level $V_{31}$ is preferably greater than the drive energy level $V_{32}$. The third set of drive energy levels $V_{31}$ and $V_{32}$ corresponds to the third set of frequency response curves $S_{31}$ and $S_{32}$, respectively, and defines the third set of drive frequency intervals $fd_{31}$ and $fd_{32}$, the frequency ranges wherein the third sets of scanning angles corresponding to the third set of drive energy levels $V_{31}$ and $V_{32}$ are either greater than or equal to the designate scanning angle $\theta_r$.

In the first embodiment, the first environment condition $T_1$, the second environment condition $T_2$, and the third environment condition $T_3$ are temperature, humidity, atmospheric pressure, or the combinations thereof. Preferably, the first environment condition $T_1$ is chosen as a typical operating condition of the torsion oscillator 304 in between the second environment condition $T_2$, and the third environment condition $T_3$. The second environment condition $T_2$ is chosen as the operating environment extreme such that the torsion oscillator 304 has the lowest resonance frequency. The third environment condition $T_3$ is chosen as the other operating environment extreme such that the torsion oscillator 304 has the highest resonance frequency. For example, the temperature of the environment extreme ranges from $-10°$ C. to $+60°$ C. and the resonance frequency of the torsion oscillator 304 is inverse proportional to the operating temperature; in other words, the resonance frequency is the highest under the lowest operating temperature of $-10°$ C. and is the lowest under the highest operating temperature of $60°$ C.

Figure 5C:
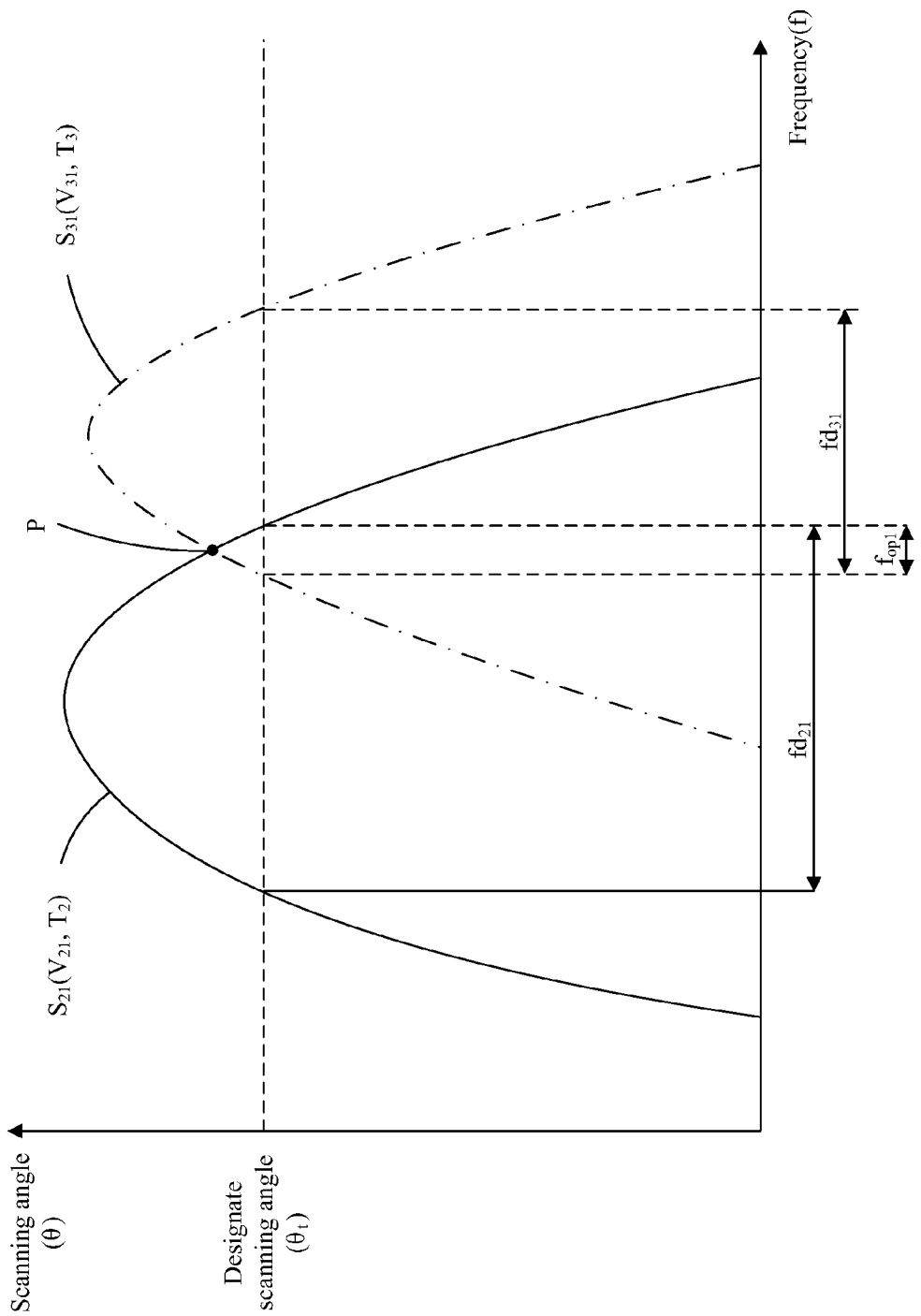
FIG. 5C is a schematic view of a predetermined frequency interval of the torsion oscillator according to the first embodiment of the present invention.

In step S506, the overlapped interval of the second set of frequency interval $fd_{21}$ and the third set of frequency interval $fd_{31}$ is defined as the predetermined frequency interval $f_{op1}$ as shown in FIG. 5C. The intersection point of the frequency response curves $S_{21}$ and the frequency response curves $S_{31}$ is the node P within the predetermined frequency interval $f_{op1}$.

Figure 5D:
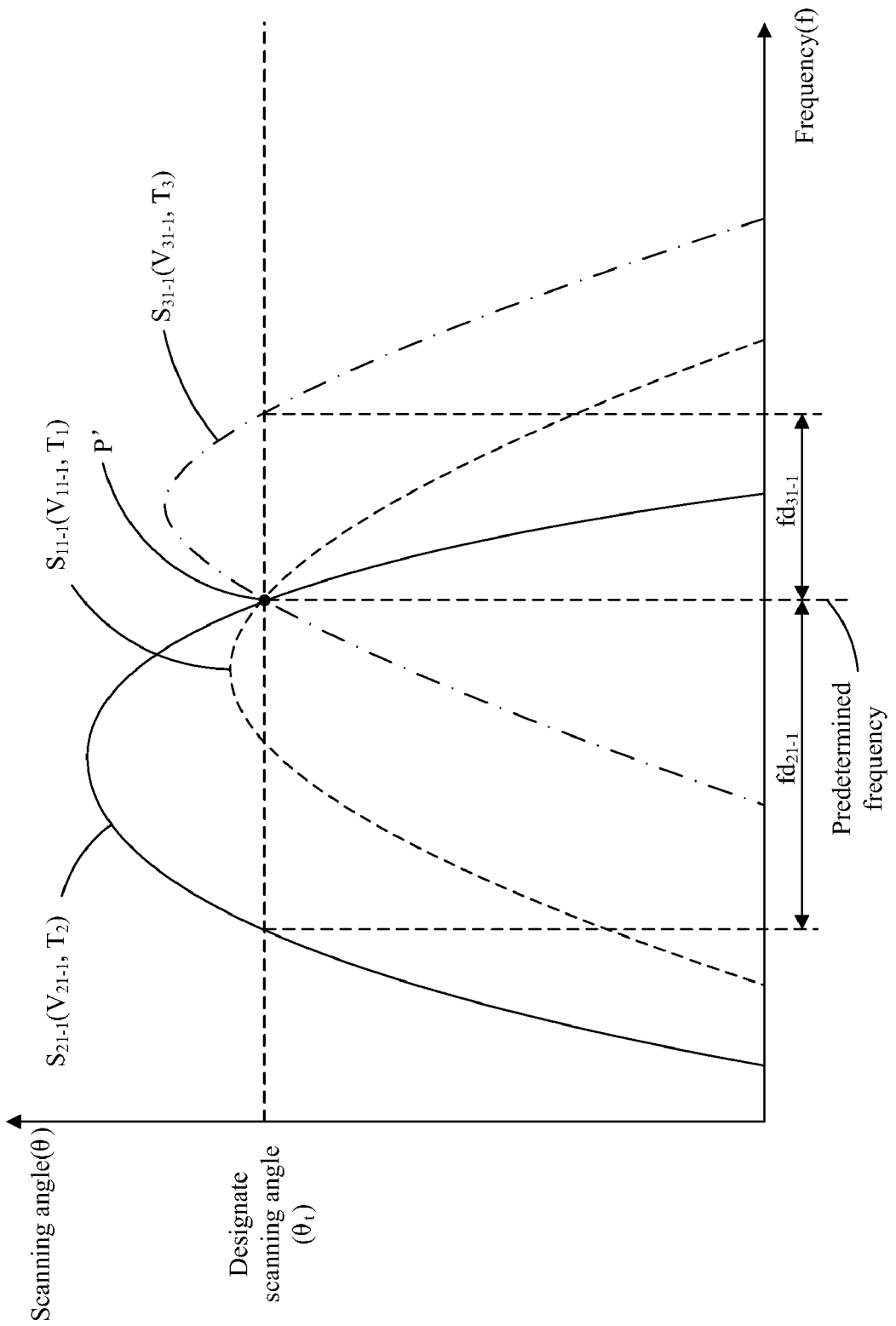
FIG. 5D is a schematic view of selecting a predetermined frequency from the predetermined frequency interval according to the first embodiment of the present invention.

By decreasing the drive energy level, $V_{21}$ and $V_{31}$, the predetermined frequency interval $f_{op1}$ will become narrower. Eventually when $V_{21}$ equals $V_{21-1}$ and $V_{31}$ equals $V_{31-1}$, the interval $f_{op1}$ collapses to become a single point P' as shown in FIG. 5D. At this point P', the torsion oscillator 304 can achieve the designate scanning angle with the minimum drive energy level under the operating environment extremes $T_2$ and $T_3$. The corresponding frequency of point P' is selected as the predetermined frequency as in step S508.

In FIG. 5D, point P' is chosen as the predetermined frequency, and $V_{11-1}$ is the initial drive energy level applied to the torsion oscillator 304 to generate scanning angle equal to the designate scanning angle $\theta_r$ under a typical operating environment condition $T_1$. When the operating environment condition becomes an extreme condition $T_2$, one can still maintain the scanning angle equal to the designate scanning angle $\theta_r$ by adjusting the drive energy level to $V_{21-1}$. The adjustment procedure is similar if the environment condition becomes the other extreme condition $T_3$, wherein the drive energy level is adjusted to be $V_{31-1}$. Operating within the environment extremes $T_2$ and $T_3$, one only need to adjust the drive energy level within the range between $V_{21-1}$ and $V_{31-1}$ to stabilize the scanning angle of the torsion oscillator 304 to the designate angle $\theta_r$, thereby simplifying the control method of the torsion oscillator 304.

Figure 6A:
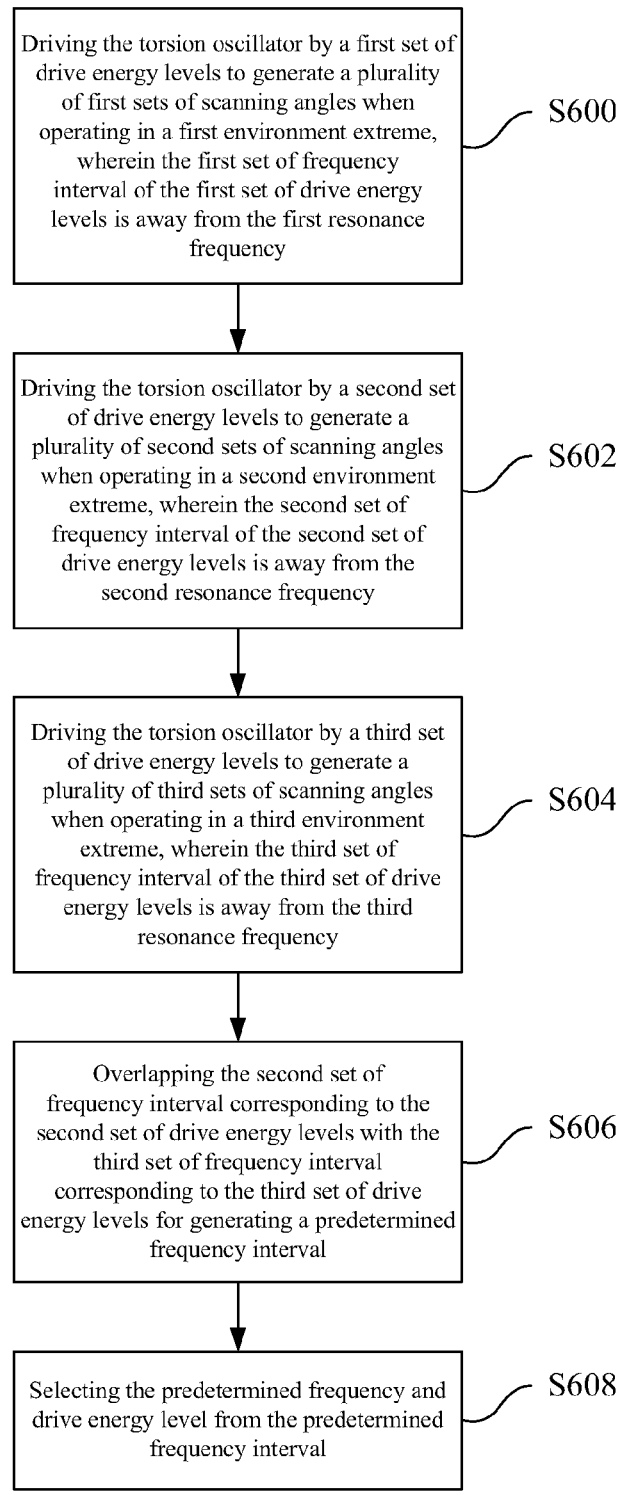
FIG. 6A is a flow chart of determining the predetermined frequency according to the second embodiment of the present invention.
Figure 6B:
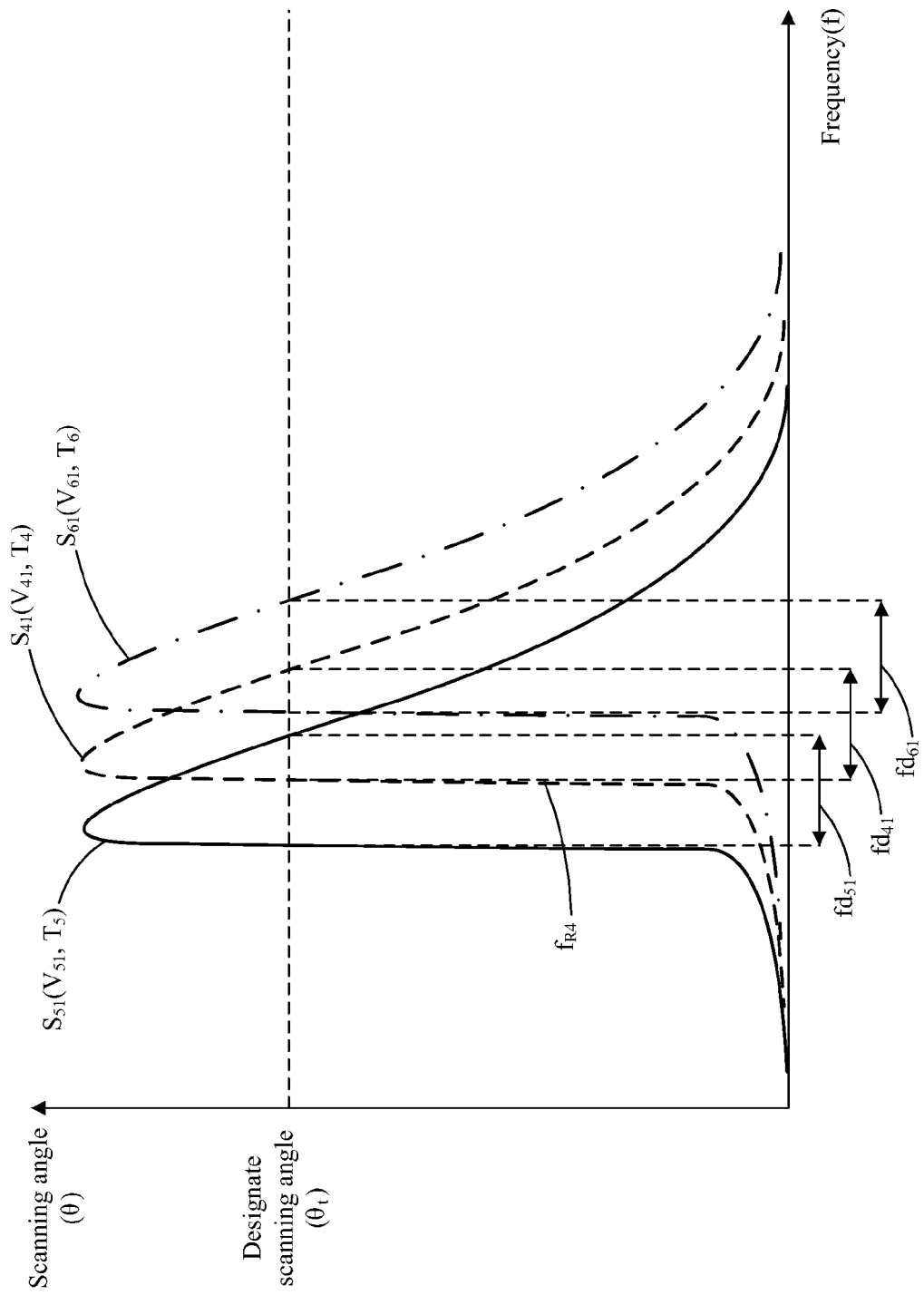
FIG. 6B is a schematic view of frequency response curves when the torsion oscillator is operated under different environment conditions according to the second embodiment of the present invention.

FIG. 6A is a flow chart for determining the predetermined frequency according to the second embodiment of the present invention for torsion oscillator 304 exhibiting unsymmetrical or nonlinear frequency response. The nonlinear frequency responses of the torsion oscillator 304 are shown in FIG. 6B and it is to be noted that the frequency response curve is not symmetrical to its resonance frequency. For the case that the torsion oscillator 304 is driven by energy level $V_{41}$ under an environment condition $T_4$, the scanning angle of the torsion oscillator 304 increases as the drive signal frequency, higher than the frequency $f_{R4}$ decreases and the scanning angle reaches the maximum when the frequency equals $f_{R4}$, defined as the resonance frequency. The scanning angle drops rapidly if the drive frequency continues to decrease below the resonance frequency $f_{R4}$. The region below the resonance frequency $f_{R4}$ is an unstable region since the scanning angle will experience a drastic change with slight change of the drive frequency. This particular behavior of the torsion oscillator is typically termed jump phenomenon and is related to the nonlinear characteristics of the torsion oscillator.

In step S600, a first drive energy level $V_{41}$ drives the torsion oscillator 304 to generate a first set of scanning angles under a first environment condition $T_4$. The first set of scanning angles corresponding to the first drive energy level $V_{41}$ determines the first frequency response curve $S_{41}$. The first frequency interval $fd_{41}$ is defined as the frequency range wherein the scanning angle of the first frequency response curve $S_{41}$ is either greater than or equal to the designate scanning angle $\theta_t$ as shown in FIG. 6B. In one embodiment, the first set of frequency interval $fd_{41}$ of the first set of drive energy levels $V_{41}$ is away from and either higher than or equal to the first resonance frequency $f_{R4}$ of the torsion oscillator 304.

In step S602, a second drive energy level $V_5$, drives the torsion oscillator 304 to generate a second set of scanning angles under a second environment condition $T_5$. The second set of scanning angles corresponding to the second drive energy level $V_{51}$ determines the second frequency response curve $S_{51}$. The second frequency interval $fd_{51}$ is defined as the frequency range wherein the scanning angle of the second frequency response curve $S_{51}$ is either greater than or equal to the designate scanning angle $\theta_t$ as shown in FIG. 6B. In one embodiment, the second set of frequency interval $fd_{51}$ of the second set of drive energy levels $V_{51}$ is away from and either higher than or equal to the second resonance frequency of the torsion oscillator 304.

In step S604, a third drive energy level $V_{61}$ drives the torsion oscillator 304 to generate a third set of scanning angles under a third environment condition $T_6$. The third set of scanning angles corresponding to the third drive energy level $V_{61}$ determines the third frequency response curve $S_{61}$. The third frequency interval $fd_{61}$ is defined as the frequency range wherein the scanning angle of the third frequency response curve $S_{61}$ is either greater than or equal to the designate scanning angle $\theta_t$ as shown in FIG. 6B. In one embodiment, the third set of frequency interval $fd_{61}$ of the third set of drive energy levels $V_{61}$ is away from and either higher than or equal to the third resonance frequency of the torsion oscillator 304.

As shown in FIG. 6B, there is an overlap range between frequency interval $fd_{41}$ and $fd_{61}$, and another overlap range between frequency interval $fd_{41}$ and $fd_{51}$. However, there is no overlap between frequency intervals $fd_{51}$ and $fd_{61}$ and no predetermined frequency can be found if conditions $T_5$ and $T_6$ are the two operating environment extremes of the torsion oscillator 304. Thus, it is necessary to increase the drive energy levels to enlarge the frequency intervals of either one or both of $fd_{51}$ and $fd_{61}$ such that there is an overlap between the frequency intervals under the operating environment extremes.

Figure 6C:
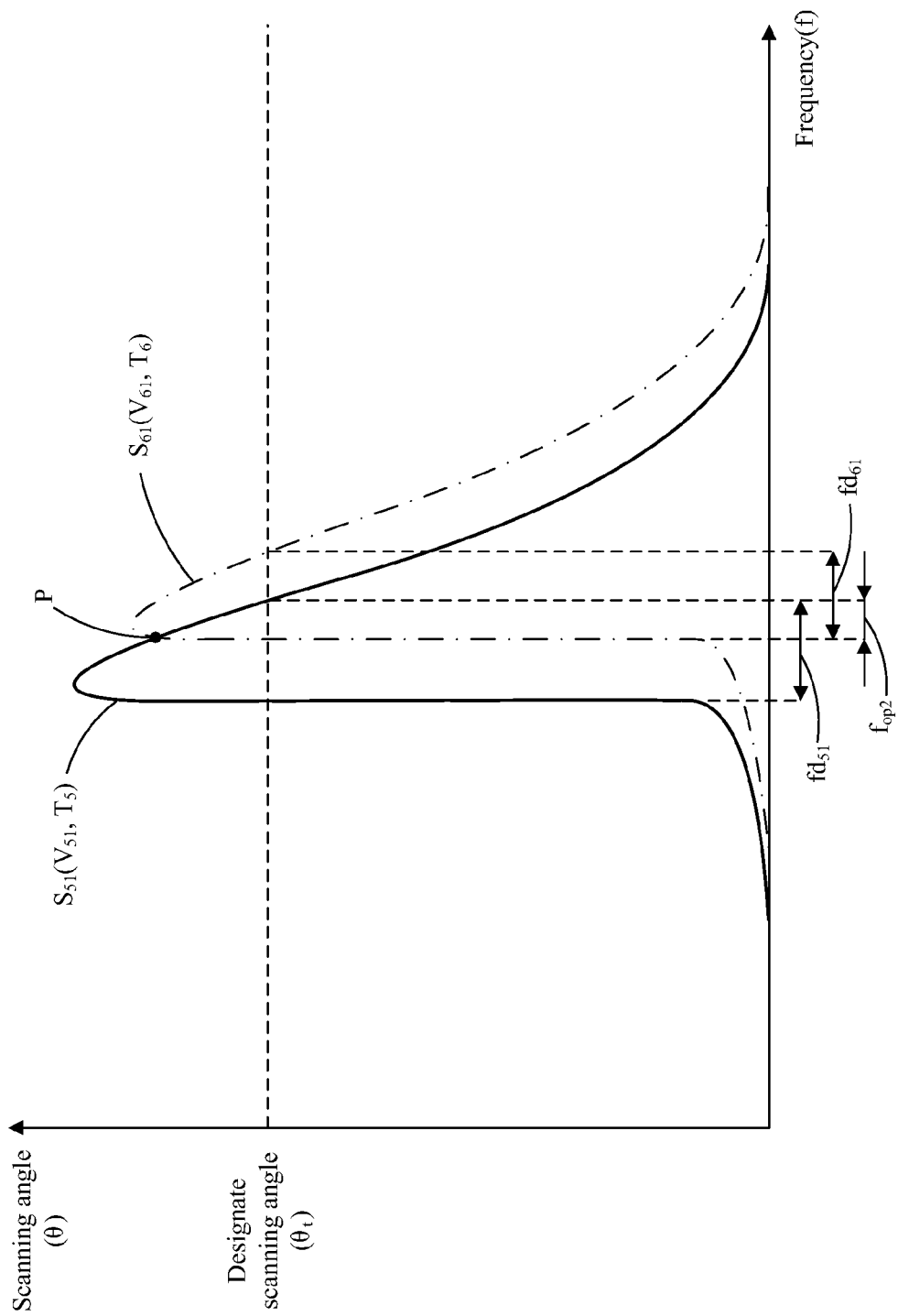
FIG. 6C is a schematic view of a predetermined frequency interval of the torsion oscillator according to the second embodiment of the present invention.

In step S606, either one or both of the second frequency interval $fd_{51}$ and the third frequency interval $fd_{61}$ are adjusted to overlap each other by adjusting the drive energy level $V_{51}$ and $V_{61}$ as shown in FIG. 6C. The overlapped interval is defined as the predetermined frequency interval $f_{op2}$. The intersection of the frequency response curve $S_5$, and the frequency response curve $S_{61}$ is a point P within the predetermined frequency interval $f_{op2}$. However, the intersection point P is located in an unstable region of curve S61 wherein the scan angle may drop drastically with slight change of the drive frequency. If the intersection point P is to be chosen as the predetermined frequency, it will be extremely difficult to control the torsion oscillator 304 to prevent from drastic change of the scanning angle due to environment condition change. Therefore, it is necessary to adjust the drive energy level $V_{51}$ and $V_{61}$ such that the intersection point is located away from the unstable regions of all operating environment conditions.

Figure 6D:
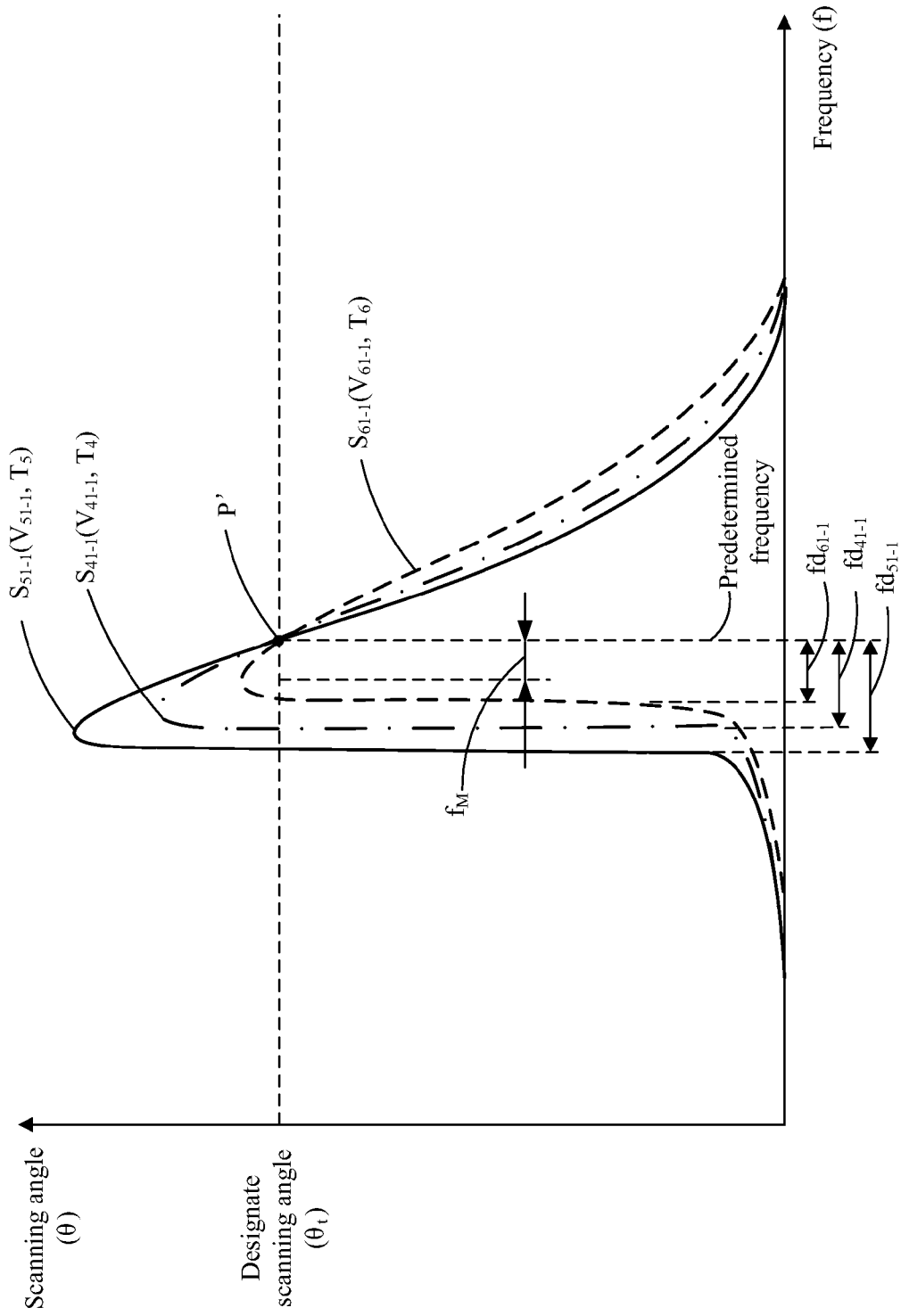
FIG. 6D is a schematic view of selecting a predetermined frequency from the predetermined frequency interval according to the second embodiment of the present invention.

FIG. 6D is a schematic view of selecting a predetermined frequency away from the unstable region for torsion oscillator 304 with nonlinear frequency response. In step S608 and also shown in FIG. 6D, one can adjust the drive energy level $V_{51}$ and $V_{61}$ such that $V_{51}$ equals $V_{51-1}$ and $V_{61}$ equals $V_{61-1}$ and the predetermined frequency interval $f_{op2}$ becomes narrower and away from the unstable region of both frequency curves $S_{51}$ and $S_{61}$. As a result, the intersection point P' is located on the higher frequency extreme of the predetermined frequency interval and the corresponding scanning angle is equal to the designate angle $\theta_t$. In order to ensure stable operation with a safety margin, the predetermined frequency P' can be chosen away from the lowest resonance frequency of the operating environment extremes by a frequency range $f_M$. Under this predetermined frequency, the torsion oscillator 304, operating within the environment extremes $T_5$ and $T_6$, can be maintained at the designate scanning angle $\theta_t$ by adjusting the drive energy level between $V_{51-1}$ and $V_{61-1}$, and thereby simplifying the control method of the torsion oscillator 304.

Figures 7, 8:
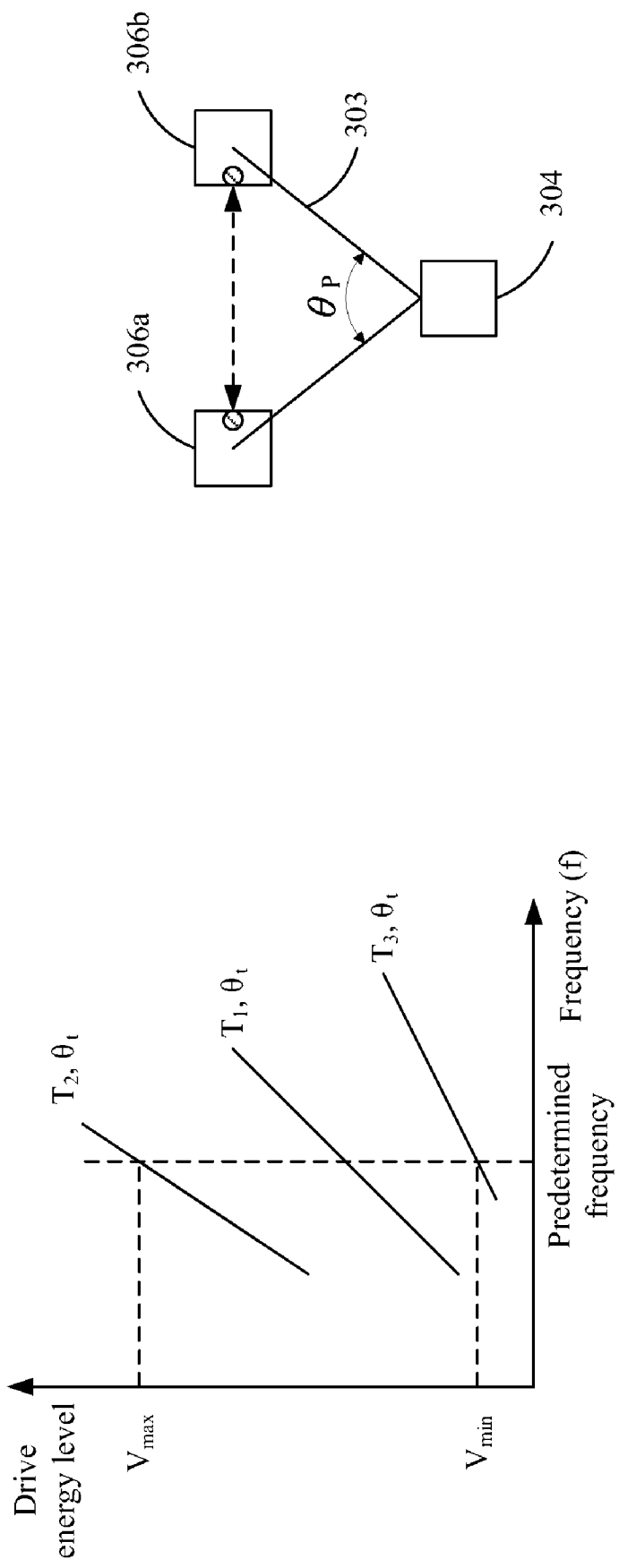
FIG. 7 is a schematic diagram showing the relationship between the drive energy level and the frequency wherein the torsion oscillator is operated under different environment extremes with the scanning angle equal to the designate scanning angle according to one embodiment of the present invention.
FIG. 8 is a schematic view of the arrangement of the torsion oscillator and the sensors according to one embodiment of the present invention.

FIG. 7 is a schematic diagram showing the relationship between the drive energy level and the drive signal frequency while operating the torsion oscillator 304 at a designate scanning angle $\theta_t$ under different environment conditions $T_1$, $T_2$ and $T_3$. The horizontal axis represents the scanning frequency and the vertical axis represents the applied drive energy level. The higher the drive frequency is the higher energy level is required to maintain the torsion oscillator 304 at $\theta_t$. Under environment extremes $T_2$ and $T_3$, the torsion oscillator 304 can maintain at the designate scan angle $\theta_t$ by applying drive energy levels at the maximum value $V_{max}$ and the minimum value $V_{min}$, respectively. $T_1$ is a typical operating condition in between environment extremes $T_2$ and $T_3$. According to the procedures outlined previously, one can maintain the scanning angle of the torsion oscillator 304 at the designate scanning angle $\theta_t$ by adjusting drive energy level between $V_{min}$ and $V_{max}$ with the drive frequency equal to the predetermined frequency under operating environment conditions in between $T_2$ and $T_3$.

The control method of the present invention utilizes the characteristic curves between the scanning angle and the scanning frequency under operating environment extremes to define an operation frequency interval according to a designate scanning angle. Furthermore, the control method minimizes the drive energy level to determine a predetermined frequency out of the operation frequency intervals and determines the maximum and minimum required energy levels to maintain the designate scanning angle. In practice, torsion oscillators of specific design parameters are tested under operating environment extremes for their characteristic responses to determine the predetermined frequency based on the method described previously. For actual implementation in image forming systems, the drive frequency of the torsion oscillator 304 is kept at the predetermined frequency and the drive energy level is adjusted to keep the scanning angle constant if variation of scanning angle is detected. Consequently, the control method of the present invention eliminates the needs of iteration to determine the resonance frequency during start-up and during operation, and thus reduces the costs of the control module and the associated components in an image forming apparatus.

FIG. 8 is a schematic view of the arrangement of the torsion oscillator 304 and the sensors 306a and 306b according to one embodiment of the present invention. The sensors 306a and 306b are positioned at the left and the right limits of the scanning span of the deflected light beam 303 such that the effective scanning angle $\theta_P$ or the usable scan span for image forming is close to the full scanning span of the torsion oscillator 304. During each scanning cycle, each of the sensors is triggered only once. The arrangement makes the best use of the scanning angle and simplifies the detection of the variation of the scanning angle, which is described below.

Figure 9:
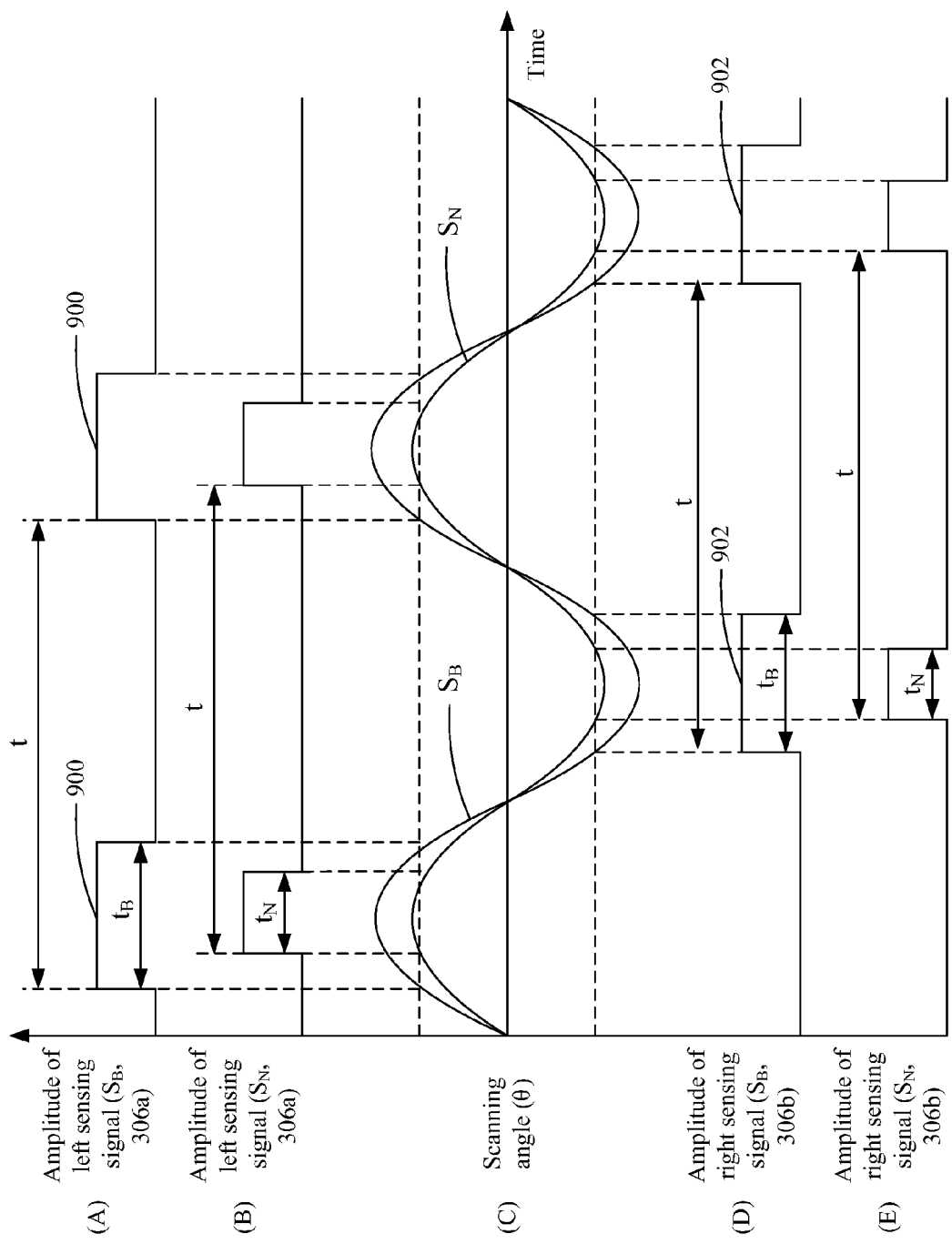
FIG. 9 illustrates the waveforms of the sensing signals and the scanning angle according to the arrangement as shown in FIG. 8.

Please refer to FIG. 3, FIG. 8 and FIG. 9. FIG. 9 illustrates waveforms of the deflected light beam 303 and the sensing signals generated by sensors 306a and 306b with time according to the configuration as arranged in FIG. 8. The curve $S_B$ in Diagram (C) of FIG. 9 shows the scanning angle versus time under the initial environment condition. The torsion oscillator 304 operates at the predetermined frequency with the initial drive energy level. Whenever the deflected light beam scans to the left limit of the scanning span, it triggers sensor 306a and sensing signal pulses 900 are generated. Diagram (A) of FIG. 9 illustrates the corresponding sensing signal pulses 900 versus time. Similarly, the sensing signal pulses 902 are generated from the sensor 306b when the deflected light beam scans to the right limit of the scanning span. Diagram (D) of FIG. 9 shows the corresponding sensing signal pulses versus time. It is noted that the time width $t_B$ of the triggered sensing signal pulse is proportional to the scanning span.

Now assume the environment condition changes and the resonance frequency of the torsion oscillator 304 becomes lower than the predetermined frequency. Since the torsion oscillator 304 keeps operating at the predetermined frequency, the scanning span becomes smaller, as shown in curve $S_N$ in diagram (C). The scanning span still covers both sensors, but the time interval $t_B$, the interval of the sensing signal pulse 900 becomes $t_N$ which is shorter than the initial value $t_B$. The control module 308 is able to detect the variation of the scanning span by monitoring the time interval of the sensing signal pulse versus time. The control module 308 can then adjust the drive energy level accordingly to maintain a constant scanning angle.

The features of the present invention includes simplifying the control method of the torsion oscillator, saving the computation time of the resonance frequency of the torsion oscillator, decreasing the manufacturing cost of the image systems, and increasing the useful scanning angle by sensing the scanning angle change at the limits of the scan span.

As is understood by a person skilled in the art, the foregoing preferred embodiments of the present invention are illustrative rather than limiting of the present invention. It is intended that they cover various modifications and similar arrangements be included within the spirit and scope of the appended claims, the scope of which should be accorded the broadest interpretation so as to encompass all such modifications and similar structure.

What is claimed is:

1. A method of controlling a torsion oscillator for stabilizing the oscillation amplitude comprising the steps of:
   driving the torsion oscillator at a predetermined frequency with a drive energy level by a control module to generate a scanning angle of an incident light beam;
   comparing the scanning angle corresponding to the drive energy level with a designate scanning angle by the control module; and
   adjusting the drive energy level based on the compared result until the scanning angle of the torsion oscillator is equal to the designate scanning angle,
   wherein the predetermined frequency and the drive energy level are determined by the steps of:
      driving the torsion oscillator by a first set of drive energy levels to obtain a first set of frequency response curves under a first environment condition, and defining a first set of frequency intervals according to the designate scanning angle;
      driving the torsion oscillator with a second set of drive energy levels to obtain a second set of frequency response curves under a second environment condition, and defining a second set of frequency intervals according to the designate scanning angle;
      driving the torsion oscillator with a third set of drive energy levels to obtain a third set of frequency response curves under a third environment condition, and defining a third set of frequency intervals according to the designate scanning angle;
      overlapping the second set of frequency intervals corresponding to the second set of drive energy levels with the third set of frequency intervals corresponding to the third set of drive energy levels to define a predetermined frequency interval; and
      selecting the predetermined frequency from the predetermined frequency interval.

2. The method of claim 1, wherein the scanning angles of the first set of frequency response curves within the first set of frequency intervals are either greater than or equal to the designate scanning angle.

3. The method of claim 1, wherein the scanning angles of the second set of frequency response curves within the second set of frequency intervals are either greater than or equal to the designate scanning angle.

4. The method of claim 1, wherein the scanning angles of the third set of frequency response curves within the third set of frequency intervals are either greater than or equal to the designate scanning angle.

5. The method of claim 1, wherein the first environment condition is in between the second and the third environment conditions and the second and the third environment conditions are the operating environment extremes such that the torsion oscillator has the lowest and the highest resonance frequencies, respectively.

6. The method of claim 5, wherein the predetermined frequency is the frequency within the predetermined frequency interval that minimizes the second and the third sets of drive energy levels according to the designate scanning angle.

7. The method of claim 6, wherein the drive energy level is the energy level applied to the torsion oscillator at the predetermined frequency such that the generated scanning angle is equal to the designate scanning angle under the first environment condition.

8. The method of claim 1, wherein during the step of comparing the scanning angle corresponding to the drive energy level with the designate scanning angle, the control module keeps the drive energy level constant if the scanning angle is equal to the designate scanning angle.

9. The method of claim 1, wherein during the step of comparing the scanning angle corresponding to the drive energy level with the designate scanning angle, the control module adjusts the drive energy level for equalizing the scanning angle to the designate scanning angle if the scanning angle is either greater than or smaller than the designate scanning angle.

10. The method of claim 1, wherein during the step of comparing the scanning angle corresponding to the drive energy level with the designate scanning angle, a plurality of sensors further sense the left scanning limit and the right scanning limit of the scanning angle of the torsion oscillator, respectively.

11. The method of claim 10, further comprising a step of detecting a time difference between the sensing signals of the sensors corresponding to the scanning angle.

12. The method of claim 11, wherein the drive energy level is decreased for equalizing the scanning angle to the designate scanning angle if the time difference between the sensing signals corresponding to the scanning angle is greater than the time difference corresponding to the designate scanning angle.

13. The method of claim 11, wherein the drive energy level is increased for equalizing the scanning angle to the designate scanning angle if the time difference between the sensing signals corresponding to the scanning angle is smaller than the time difference corresponding to the designate scanning angle.

14. A method of controlling a torsion oscillator with non-linear jump phenomenon for stabilizing the oscillation amplitude, the method comprising the steps of:
   generating a predetermined frequency and a drive energy level by a control module;
   driving the torsion oscillator by the drive energy level with the predetermined frequency to generate a scanning angle of an incident light beam;
   comparing the scanning angle with a designate scanning angle by the control module; and
   adjusting the drive energy level based on the compared result until the scanning angle of the torsion oscillator is equal to the designate scanning angle,
   wherein the predetermined frequency and the drive energy level are determined by the steps of:
      driving the torsion oscillator by a first set of drive energy levels to generate a first set of frequency response curves under a first environment condition, and defining a first set of frequency intervals according to the designate scanning angle;
      driving the torsion oscillator by a second set of drive energy levels to generate a second set of frequency response curves under a second environment condition, and defining a second set of frequency intervals according to the designate scanning angle;
      driving the torsion oscillator by a third set of drive energy levels to generate a third set of frequency response curves under a third environment condition, and defining a third set of frequency intervals according to the designate scanning angle;
      overlapping the second set of frequency intervals corresponding to the second set of drive energy levels with the third set of frequency intervals corresponding to the third set of drive energy levels to define a predetermined frequency interval; and
      selecting the predetermined frequency from the predetermined frequency interval.

15. The method of claim 14, wherein the first environment condition is in between the second and the third environment conditions and the second and the third environment conditions are the operating environment extremes such that the torsion oscillator has the lowest and the highest resonance frequencies, respectively.

16. The method of claim 15, wherein the predetermined frequency the frequency that minimizes the second and the third sets of drive energy levels according to the designate scanning angle and is located higher than the highest resonance frequency of the torsion oscillator under the second and the third environment conditions by a safety margin.

17. The method of claim 14, wherein the drive energy level is the energy level applied to the torsion oscillator at the predetermined frequency such that the generated scanning angle is equal to the designate scanning angle under the first environment condition.

18. The method of claim 14, wherein during the step of comparing the scanning angle corresponding to the drive energy level with the designate scanning angle by the control module, the control module keeps the drive energy level constant if the scanning angle is equal to the designate scanning angle.

19. The method of claim 14, wherein during the step of comparing the scanning angle corresponding to the drive energy level with the designate scanning angle, the control module adjusts the drive energy level for equalizing the scanning angle to the designate scanning angle if the scanning angle is either greater than or smaller than the designate scanning angle.

20. The method of claim 14, wherein during the step of comparing the scanning angle corresponding to the drive energy level with the designate scanning angle, a plurality of sensors further sense the left scanning limit and the right scanning limit of the scanning angle of the torsion oscillator, respectively.

21. The method of claim 20, further comprising a step of detecting a time difference between the sensing signals of the sensors corresponding to the scanning angle.

22. The method of claim 21, wherein the drive energy level is decreased for equalizing the scanning angle to the designate scanning angle if the time difference between the sensing signals corresponding to the scanning angle is greater than the time difference corresponding to the designate scanning angle.

23. The method of claim 21, wherein the drive energy level is increased for equalizing the scanning angle to the designate scanning angle if the time difference between the sensing signals corresponding to the scanning angle is smaller than the time difference corresponding to the designate scanning angle.

* * * * *